(12) United States Patent
do Carmo et al.

(10) Patent No.: US 11,528,284 B2
(45) Date of Patent: Dec. 13, 2022

(54) METHOD FOR DETECTING AN ATTACK ON A CONTROL DEVICE OF A VEHICLE

(71) Applicant: Continental Teves AG & Co. oHG, Frankfurt am Main (DE)

(72) Inventors: Rodrigo Daniel do Carmo, Frankfurt am Main (DE); Michael Gerhard Schneider, Frankfurt am Main (DE)

(73) Assignee: Continental Teves AG & Co. oHG

( * ) Notice: Subject to any disclaimer, the term of this patent is extended or adjusted under 35 U.S.C. 154(b) by 267 days.

(21) Appl. No.: 16/650,129

(22) PCT Filed: Sep. 19, 2018

(86) PCT No.: PCT/EP2018/075298
§ 371 (c)(1),
(2) Date: Mar. 24, 2020

(87) PCT Pub. No.: WO2019/063374
PCT Pub. Date: Apr. 4, 2019

(65) Prior Publication Data
US 2021/0194893 A1    Jun. 24, 2021

(30) Foreign Application Priority Data

Sep. 27, 2017   (DE) .......................... 102017217195.2

(51) Int. Cl.
*H04L 9/40*     (2022.01)
*B60R 16/023*   (2006.01)

(52) U.S. Cl.
CPC ...... *H04L 63/1416* (2013.01); *B60R 16/0231* (2013.01); *H04L 63/0227* (2013.01); *H04L 63/20* (2013.01)

(58) Field of Classification Search
CPC .. H04L 63/20; H04L 63/1416; H04L 63/0227
(Continued)

(56) References Cited

U.S. PATENT DOCUMENTS 6,822,560 B2   11/2004   Geber et al.
10,193,859 B2   1/2019   Maeda et al.
(Continued)

FOREIGN PATENT DOCUMENTS

CN    105050868 A    11/2015
DE    102015205670 A    6/2016
(Continued)

OTHER PUBLICATIONS

Korean Notification of Reason for Refusal for Korean Application No. 10-2020-7008727, dated Jun. 7, 2021, with translation, 11 pages.
(Continued)

*Primary Examiner* — Anthony D Brown
(74) *Attorney, Agent, or Firm* — RatnerPrestia

(57) ABSTRACT

A method for detecting an attack, in particular a cyber-attack, on a control device of a vehicle, with the step of: checking communication data that is transmitted via at least one communication channel of the vehicle that is connected to the control device, wherein the checking of the communication data that is transmitted via the at least one communication channel of the vehicle that is connected to the control device includes the examination of whether the communication data transmitted via the at least one communication channel of the vehicle fulfils data requirements that are defined by one or a plurality of changeable rules.

11 Claims, 2 Drawing Sheets

(58) Field of Classification Search
USPC .............................................................. 726/1
See application file for complete search history.

(56) References Cited

U.S. PATENT DOCUMENTS

| | | | |
|---|---|---|---|
| 10,214,164 B2 | 2/2019 | Ben Noon et al. | |
| 10,356,122 B2 | 7/2019 | Ruvio et al. | |
| 10,623,205 B2 | 4/2020 | Tsurumi et al. | |
| 10,798,117 B2 | 10/2020 | Haga et al. | |
| 10,986,008 B2 | 4/2021 | Ujiie et al. | |
| 2011/0074561 A1* | 3/2011 | Mackjust | B60R 25/10 340/5.72 |
| 2014/0380475 A1 | 12/2014 | Canning et al. | |
| 2016/0119961 A1* | 4/2016 | Hrabak | H04W 76/14 455/41.2 |
| 2017/0142078 A1* | 5/2017 | Lee | H04L 63/0435 |
| 2019/0356687 A1 | 11/2019 | Hartkopp et al. | |

FOREIGN PATENT DOCUMENTS

| | | |
|---|---|---|
| EP | 1342622 A2 | 9/2003 |
| GB | 2548371 A | 9/2017 |
| JP | 2015136107 | 7/2015 |
| JP | 2016129314 A | 7/2016 |
| JP | 2017073765 A | 4/2017 |
| JP | 2017111796 A | 6/2017 |
| JP | 2017112594 A | 6/2017 |
| JP | 2017126978 A | 7/2017 |
| WO | 2013144962 A1 | 10/2013 |

OTHER PUBLICATIONS

Chinese Office Action for Chinese Application No. 201880063060.4, dated Sep. 8, 2021, with translation, 14 pages.
International Search Report and Written Opinion for International Application No. PCT/EP2018/075298, dated Nov. 2, 2018, 8 pages.
Japanese Notice of Reasons for Refusal for Japanese Application No. 2020-517169, dated Jun. 2, 2021 with translation, 3 pages.

* cited by examiner

METHOD FOR DETECTING AN ATTACK ON A CONTROL DEVICE OF A VEHICLE

CROSS REFERENCE TO RELATED APPLICATIONS

This application is the U.S. National Phase Application of PCT International Application No. PCT/EP2018/075298, filed Sep. 19, 2018, which claims priority to German Patent Application No. 10 2017 217 195.2, filed Sep. 27, 2017, the contents of such applications being incorporated by reference herein.

FIELD OF THE INVENTION

The invention relates to a method for detecting an attack, in particular a cyber-attack, on a control device of a vehicle, with the step of: checking communication data that is transmitted via at least one communication channel of the vehicle that is connected to the control device.

The invention furthermore relates to a communication system for a vehicle with at least one control device and one attack detection system that is a component of the control device or is connected for signal transfer to the control device, wherein the attack detection system is configured to check communication data that is transmitted via at least one communication channel of the vehicle that is connected to the control device.

The invention furthermore relates to a vehicle, in particular an automobile, with a communication system.

BACKGROUND OF THE INVENTION

Modern vehicles, in addition to the communication channels internal to the vehicle, regularly comprise one or a plurality of communication interfaces via which harmful data can be introduced into the communication systems of such vehicles. Electronic devices of vehicles can in particular be attacked by data of this sort, from which a functional impairment or functional failure of a control device or the vehicle can result.

No effective yet at the same time resource-saving solutions by means of which such cyber-attacks on vehicles can be recognized or prevented are known to date from the prior art.

SUMMARY OF THE INVENTION

The aspect of the present invention is thus to increase the protection of vehicles against cyber-attacks.

This is achieved by a method of the type mentioned at the beginning, wherein the checking of the communication data that is transmitted via the at the least one communication channel of the vehicle that is connected to the control device comprises an examination of whether the communication data transmitted via the at least one communication channel of the vehicle fulfils data requirements that are defined by one or a plurality of changeable rules.

An aspect of the invention makes use of the recognition that an effective and resource-saving detection of harmful data can result from a checking of the transmitted communication data if the data requirements are defined by rules. Because the rules are changeable, the rules can be adapted or updated as required to novel attack methods or data patterns. The risk of a failed detection of an attack is further significantly reduced through the use of changeable rules. An autonomous adjustment of the rules by the control device or the vehicle preferably does not take place. The rules can, for example, be communication rules that relate to the data content of the communication data. The rules can also be fulfilment rules that define data properties of the communication data that are to be fulfilled.

In one preferred form of embodiment of the method according to an aspect of the invention, this is partially or entirely carried out by an attack detection system of the vehicle that is connected for signal transfer to the control device or is a component of the control device. The checking of the communication data in particular takes place in real time. It is further preferred that communication data transferred on one, a plurality, or all the layers of an OSI (Open Systems Interconnection Model) structure are checked simultaneously by means of the method.

In a particularly preferred form of embodiment of the method according to an aspect of the invention the communication data transmitted via the at least one communication channel of the vehicle are classified as non-hazardous or harmless if the communication data fulfils the data requirements. Alternatively or in addition, the communication data transmitted via the at least one communication channel of the vehicle is classified as malicious or harmful if the communication data does not fulfil the data requirements. Preferably, the communication data does not fulfil the data requirements if one, a plurality or all of the rules are infringed by the communication data. Preferably, an evaluation of the communication data from the point of view of its potential harmfulness for the control device or the vehicle occurs, wherein the number and/or the intensity of the rule infringements by the communication data are taken into account for the evaluation.

A method according to an aspect of the invention is, moreover, preferred, in which the reception of the communication data transmitted via the at least one communication channel of the vehicle by the control device or a control unit of the control device is allowed if the communication data transmitted via the at least one communication channel of the vehicle fulfils the data requirements. Alternatively or in addition, reception of the communication data transmitted via the at least one communication channel of the vehicle by the control device or a control unit of the control device is prevented if the communication data transmitted via the at least one communication channel of the vehicle does not fulfil the data requirements. Preventing the reception has the effect that the harmful data does not reach the control device or the destination control unit of the control device, so that a functional failure or a functional impairment of the control device is effectively avoided. The method can further comprise the temporary interruption of the communication with a data source whose communication data, transmitted via the at least one communication channel of the vehicle, does not fulfil the data requirements. A temporary interruption of the communication can, for example, be appropriate if the data source is an external device that has in the past already transmitted communication data to the vehicle, but which has itself become the victim of a cyber-attack. The communication interruption can, for example, be cleared if the transmission of harmful data is prevented by the external device. Alternatively or in addition, the method can further comprise the permanent prevention of the communication with a data source whose communication data, transmitted via the at least one communication channel of the vehicle, does not fulfil the data requirements. Through the permanent prevention of communication, later attempts at an attack originating from this data source can also be effectively averted.

The method according to an aspect of the invention is further advantageously developed in that the one or plurality of rules that specify the data requirements are changed. Alternatively or in addition, the one or the plurality of rules defining the data requirements are supplemented by one or a plurality of further rules. In addition, one or a plurality of the rules defining the data requirements can be cancelled or deleted. It can, moreover, be advantageous to exchange one or a plurality of the rules defining the data requirements. The changing, supplementing, cancelling, deleting and/or exchanging of the rules takes place to adapt the data requirements to be satisfied by the communication data to novel attack methods and/or novel data patterns of harmful communication data.

A method according to an aspect of the invention is further preferred in which the one or the plurality of rules defining the data requirements are protected against modifications by means of a hardware-based trust anchor. The hardware-based trust anchor ensures a hardware-supported encryption and/or signature of the rules defining the one or the plurality of data requirements. In this way it is possible to effectively avoid the rules for modification of the data requirements being changed, cancelled or deleted. In this way a preparatory attack that intends to change the data requirements that are to be satisfied is effectively avoided.

In another preferred form of embodiment of the method according to an aspect of the invention, the communication data that is transmitted via the at least one communication channel of the vehicle connected to the control device and checked is received via a communication interface of the vehicle. The communication interfaces can, for example, be connected for signal transfer with, for example, a communication channel of the vehicle implemented as a CAN bus, CAN-FD bus, Flexray bus and/or as a LIN bus. Alternatively or in addition, the communication interface can be an Ethernet interface or a communication interface of a communication module of the vehicle that is configured to communicate wirelessly and/or over wires with external devices. Alternatively or in addition, the communication data that is transmitted via the at least one communication channel of the vehicle that is connected to the control device and checked can be data internal to the vehicle that is stored in a memory internal to the vehicle or which is generated by the vehicle. The data internal to the vehicle can, for example, comprise protocols, in particular access protocols, parameters and/or measured values. All the data transmitted from outside into the vehicle, as well as all the data stored in the vehicle and generated by the vehicle itself, can thus be checked by means of the method.

In a further development of the method according to an aspect of the invention, the control device is operated as a client-control device of a network internal to the vehicle, wherein the checking of the communication data takes place jointly by the client control device and by a server control device of the network internal to the vehicle. The checking of the communication data can, alternatively, be performed autonomously by the control device. In this case, the control device can itself, independently of further additional devices such as, for example, a server control device, carry out the check for harmful communication data.

In a further preferred form of embodiment of the method according to an aspect of the invention, an apparently erroneous check signal can be transmitted from the client control device to the server control device and/or checked by the server control device to see whether the check signal received by the server control device corresponds to the check signal transmitted by the client control device or has been changed. Alternatively or in addition, the method comprises the generation of a check response to the received check signal by the server control device and/or the transmission of the generated check response from the server control device to the client control device, wherein the checking of communication data that is transmitted via the at least one communication channel of the vehicle that is connected to control device preferably comprises the checking of the check response generated by the server control device. Because an apparently erroneous check signal was transmitted, a potential attack possibility on the control device or on the vehicle is suggested to a hacker. Erroneous signals can be supplemented and/or overlaid with harmful data in order to generate an apparently error-free signal. If, in the present case, an apparently error-free signal is received by the server control device, even though an apparently erroneous check signal was transmitted, it can be deduced that harmful data has been introduced, whereby an attack can be established. What is known as a honeypot strategy is implemented through the deliberate transmission of an apparently erroneous check signal.

In a further preferred form of embodiment of the method according to an aspect of the invention, the checking of the communication data is carried out in a load-distribution mode in which not all but only some individual data packets are checked from the point of view of fulfilment of the data requirements. For example, every second or third data packet can here be checked for fulfilment of the data requirements. The required computing power is significantly reduced in this way, so that a further saving in resources is achieved.

In a further preferred form of embodiment, the method according to an aspect of the invention is a computer-implemented method. In this case, a computer program product can be implemented comprising commands which, when the program is executed by a computer, in particular a computer in a vehicle, cause this to carry out a method according to one of the forms of embodiment described above. A computer-readable storage medium can, further, be implemented in this way, comprising commands that, when the program is executed by a computer, in particular by a computer in a vehicle, cause this to carry out a method according to one of the forms of embodiment described above.

An aspect of the invention is further achieved through a communication system of the type mentioned at the beginning, wherein the communication system is configured to carry out the method for detecting an attack, in particular a cyber-attack, on a control device of a vehicle according to one of the forms of embodiment described above. With regard to the advantages and modifications of the communication system according to an aspect of the invention, reference is made to the advantages and modifications of the method according to an aspect of the invention.

An aspect of the invention is furthermore achieved by a vehicle of the type mentioned at the beginning, wherein the communication system is designed according to one of the forms of embodiment described above. With regard to the advantages and modifications of the vehicle according to an aspect of the invention, reference is made to the advantages and modifications of the method according to an aspect of the invention.

BRIEF DESCRIPTION OF THE DRAWINGS

Preferred embodiments of the invention are explained and described in more detail below with reference to the accompanying drawings. In the drawing.

DETAILED DESCRIPTION OF THE PREFERRED EMBODIMENTS

Figure 1:
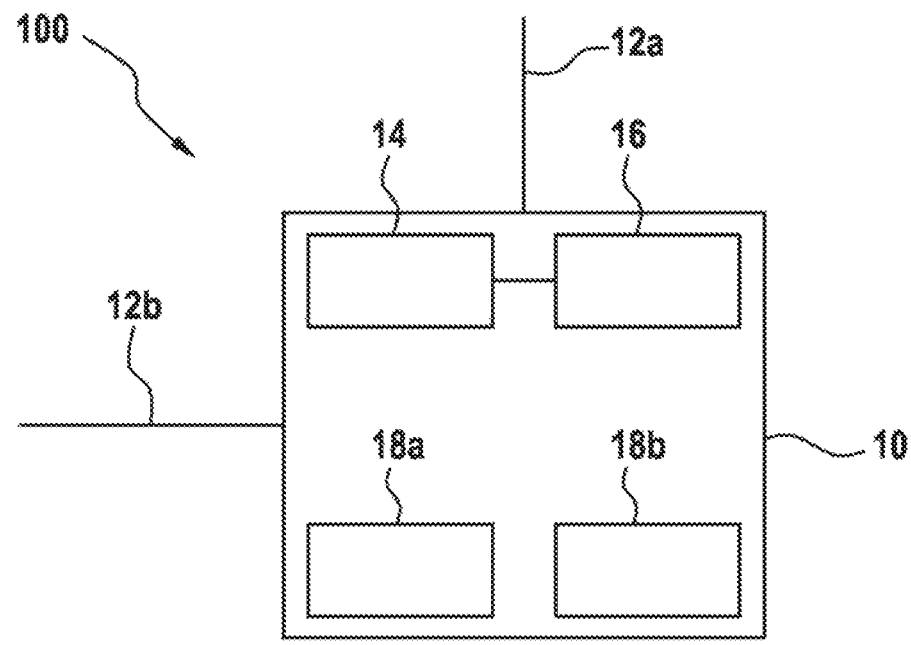
FIG. 1 shows an exemplary embodiment of the communication system according to the invention in a schematic illustration.

FIG. 1 shows a communication system 100 for a vehicle with a control device 10 that comprises an attack detection system 14. The attack detection system 14 is configured to check communication data that is transmitted via the communication channels 12a, 12b of the vehicle that are connected to the control device 10.

While checking the communication data, the question of whether the communication data fulfils data requirements that are defined by a plurality of rules is examined in real time. The attack detection system 14 is configured to classify communication data as non-hazardous or harmless if the communication data fulfils the data requirements. The attack detection system 14 is, on the other hand, configured to classify communication data as malicious or harmful if the communication data does not fulfil the data requirements.

In order that an adaptation of the rules for the protection of the control device 10 from new attack methods and/or new harmful data can take place, the rules that define the data requirements can be changed, supplemented, cancelled or deleted and exchanged.

To avoid a modification of the rules that would have the consequence of a corresponding change in the data requirements by an attacker, the rules are protected against modification by means of a hardware-based trust anchor. The hardware-based trust anchor is implemented by the security module 16 that is connected for signal transfer to the attack detection system 14.

In addition to the attack detection system 14 and the security module 16, the control device 10 also comprises a plurality of control units 18a, 18b that represent potential recipients of the communication data. The control device can, in principle, comprise a large number of control units that can be potential recipients of the communication data. If the communication data is classified as non-hazardous or harmless, it can, for example, be forwarded to the control units 18a, 18b for the implementation of a control process.

Figure 2:
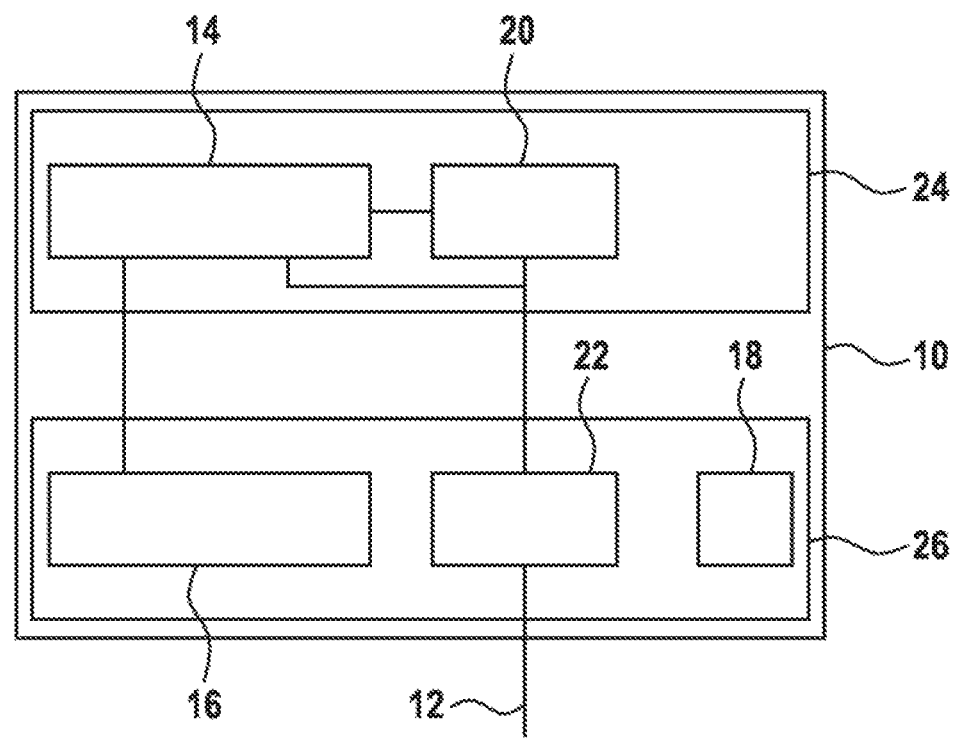
FIG. 2 shows a control device in a schematic illustration.

FIG. 2 shows a control device 10 that is divided schematically into a software stack 24 and hardware 26.

The control device 10 comprises a hardware-side communication interface 22 that is connected to a software-side communication module 20. The control device is connected via the communication interface 22 to a communication channel 12 via which harmful data can be loaded onto the control device 10. The communication data received via the communication interface 22 is made available to an attack detection system 14 by the communication module 20.

The attack detection system 14 is configured to examine the communication data in real time as to whether the communication data fulfils data requirements that are defined by a plurality of rules. The attack detection system 14 is, moreover, configured to permit the reception of the communication data by a control unit 18 of the control device 10 if the communication data fulfil the data requirements, and to prevent the reception of the communication data by the control unit 18 of the control device 10 if the communication data do not fulfil the data requirements, and to prevent the reception of the communication data by the control unit 18 of the control device 10 if the communication data does not fulfil the data requirements.

The rules that define the data requirements are protected against modification by means of a hardware-based trust anchor. The control device 10 comprises for this purpose a hardware-side security module 16 that encrypts the rules.

Figure 3:
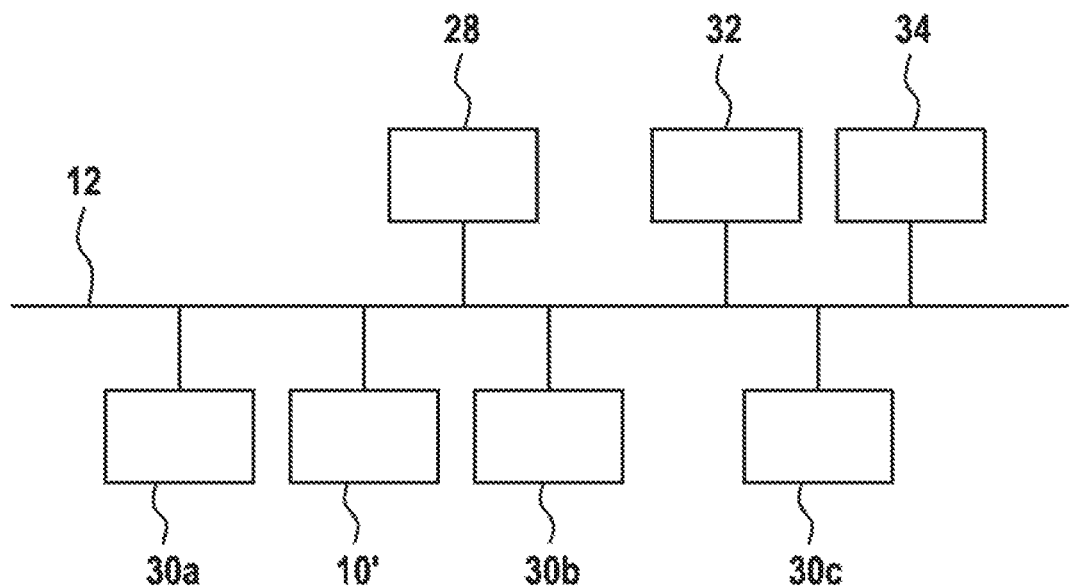
FIG. 3 shows a further exemplary embodiment of the communication system according to the invention in a schematic illustration.

FIG. 3 shows a communication channel 12 formed as a CAN bus that is connected to a plurality of control devices 10', 28, 30a-30c. The communication channel 12 is moreover connected to a telematic apparatus 32 and a communication interface 34. The communication interface 34 can, for example, serve for vehicle-to-vehicle communication, and be configured to exchange communication data wirelessly with other vehicles.

The communication data that is transmitted via the communication channel 12 of the vehicle and that is to be checked can thus either be received via the communication interface 34 of the vehicle, or be data internal to the vehicle that is stored, for example, in a memory that is internal to the vehicle or is generated by the vehicle, wherein the data internal to the vehicle is transmitted within the vehicle via the communication channel 12.

The control device 10' is operated as a client control device of a network internal to the vehicle. The checking of the communication data takes place in this case jointly by the client control device 10' and a server control device 28 of the network internal to the vehicle. The attack detection system is thus partially integrated into the client control device 10' and partially into the server control device 28.

In the present case the attack detection system is designed to temporarily interrupt or to permanently prevent communication with a data source, inasmuch as this is identifiable, if the communication data transmitted from the data source via the communication channel 12 does not fulfil the data requirements. In this way, other devices which permanently or temporarily transmit harmful communication data are temporarily or permanently excluded from the communication.

Figure 4:
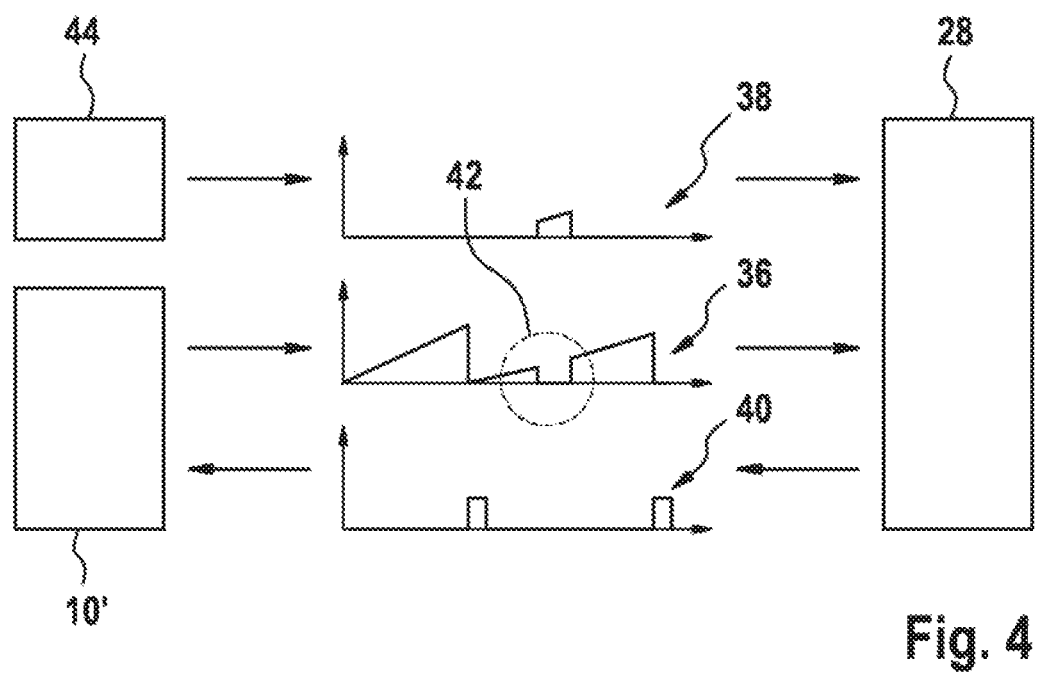
FIG. 4 shows a communication between a client control device and a server control device corresponding to one exemplary embodiment of the method according to the invention.

FIG. 4 shows the transmission of an apparently erroneous check signal 36 from a client control device 10' to a server control device 28. The apparently erroneous check signal 36 comprises a signal error 42 that can be exploited by an attacker 44.

The attacker 44 transmits a signal extension 38 extending the apparently erroneous check signal. The check signal received by the server control device 28 now appears to be error-free as a result of the signal extension 38. The server control device 28 is configured to generate a check response 40 for the received check signal 36 and to transmit it to the client control device 10'. In the present case the server control device is configured to generate a short signal pulse in the check response 40 at every zero contact of the check signal 36.

The client control device 10' can henceforth recognize that the apparently erroneous check signal 36 has been modified by an attacker 44, since the check response 40 does not correspond to the expected check response. Since the received check response 40 differs from the expected check response, it is also possible to deduce that a signal modification has been made by an attacker 44, and the received communication data is malicious or harmful.

Because an apparently erroneous check signal 36 was transmitted, the attacker 44 has been tempted to exploit the signal error 42 of the check signal 36. On the basis of the intentional transmission of this signal, what is known as a honeypot functionality has in this way been implemented, with which the attacker 44 has been tempted to carry out expected attacks.

LIST OF REFERENCE DESIGNATIONS

10 Control device
10' Client control device
12, 12*a*, 12*b* Communication channels
14 Attack detection system
16 Security module
18, 18*a*, 18*b* Control units
20 Communication module
22 Communication interface
24 Software stack
26 Hardware
28 Server control device
30*a*-30*c* Other control devices
32 Telematic apparatus
34 Communication interface
36 Check signal
38 Signal extension
40 Check response
42 Signal error
44 Attacker
100 Communication system

The invention claimed is:

1. A method for detecting a cyber-attack on a control device of a vehicle, comprising:
    transmitting communication data over a communication channel from a first device in the vehicle to a second device in the vehicle;
    generating, by the second device in the vehicle, a check response by applying at least one changeable rule to the communication data;
    transmitting the check response over the communication channel from the second device in the vehicle to the first device in the vehicle;
    analyzing, by the first device in the vehicle, the check response and in response to the analysis:
        determining, by the first device in the vehicle, that the communication data was properly received by the second device in the vehicle when the check response matches a predetermined check response generated by applying the at least one changeable rule to the communication data, and
        determining, by the first device in the vehicle, that the communication data was erroneously received by the second device in the vehicle when the check response does not match the predetermined check response generated by applying the at least one changeable rule to the communication data.

2. The method as claimed in claim 1,
    further comprising:
        classifying the communication data transmitted via the at least one communication channel of the vehicle as non-hazardous or harmless if the communication data fulfils data requirements defined by the at least one changeable rule; and
        classifying the communication data transmitted via the at least one communication channel of the vehicle as malicious or harmful if the communication data does not fulfil the data requirements.

3. The method as claimed in claim 1, further comprising:
    allowing the reception of the communication data transmitted via the at least one communication channel of the vehicle by the control device or a control unit of the control device if the communication data transmitted via the at least one communication channel of the vehicle fulfils data requirements defined by the at least one changeable rule;
    preventing the reception of the communication data transmitted via the at least one communication channel of the vehicle by the control device or a control unit of the control device if the communication data transmitted via the at least one communication channel of the vehicle does not fulfil the data requirements; and
    temporarily interrupting or permanently preventing the communication with a data source whose communication data, transmitted via the at least one communication channel of the vehicle, does not fulfil the data requirements.

4. The method as claimed in claim 1, further comprising:
    changing the at least one changeable rule that defines the data requirements;
    supplementing the at least one changeable rule that defines the data requirements with one or a plurality of further rules;
    cancelling or deleting the one or the plurality of the rules defining the data requirements; and
    exchanging the one or the plurality of the rules defining the data requirements.

5. The method as claimed in claim 1, wherein the at least one changeable rule defining the data requirements is protected against modification by means of a hardware-based trust anchor.

6. The method as claimed in claim 1, wherein the communication data that is transmitted via the at least one communication channel of the vehicle that is connected to the control device and checked is data received via a communication interface of the vehicle and/or data that is internal to the vehicle that is stored in a memory internal to the vehicle or which is generated by the vehicle.

7. The method as claimed in claim 1, wherein the control device is operated as a client-control device of a network internal to the vehicle, wherein the checking of the communication data takes place jointly by the client control device and by a server control device of the network internal to the vehicle.

8. The method as claimed in claim 7,
    further comprising:
        transmitting an apparently erroneous check signal from the client control device to the server control device;
        checking by the server control device whether the check signal received by the server control device corresponds to the check signal transmitted by the client control device or has been changed;
        generating a check response to the received check signal by the server control device; and
        transmitting the generated check response from the server control device to the client control device,
    wherein the checking of communication data that has been transmitted via the at least one communication channel of the vehicle connected to the control device preferably comprises checking the check response generated by the server control device.

9. A communication system for a vehicle, including:
    a first device in the vehicle; and
    a second device in the vehicle, wherein the first device is configured to transmit communication data over a communication channel to the second device,
wherein the second device is configured to:
generate a check response by applying at least one changeable rule to the communication data, and
transmit the check response over the communication channel to the first device;
wherein the first device is configured to analyze the check response and in response to the analysis:
determine that the communication data was properly received by the second device in the vehicle when the check response matches a predetermined check response generated by applying the at least one changeable rule to the communication data, and
determine that the communication data was erroneously received by the second device in the vehicle when the check response does not match the predetermined check response generated by applying the at least one changeable rule to the communication data.

10. A vehicle comprising:
a communication system for the vehicle, the communication system including:
a first device in the vehicle; and
a second device in the vehicle,
wherein the first device is configured to transmit communication data over a communication channel to the second device,
wherein the second device is configured to:
generate a check response by applying at least one changeable rule to the communication data, and
transmit the check response over the communication channel to the first device;
wherein the first device is configured to analyze the check response and in response to the analysis:
determine that the communication data was properly received by the second device in the vehicle when the check response matches a predetermined check response generated by applying the at least one changeable rule to the communication data, and
determine that the communication data was erroneously received by the second device in the vehicle when the check response does not match the predetermined check response generated by applying the at least one changeable rule to the communication data.

11. The method as claimed in claim 2, further comprising:
allowing the reception of the communication data transmitted via the at least one communication channel of the vehicle by the control device or a control unit of the control device if the communication data transmitted via the at least one communication channel of the vehicle fulfils the data requirements;
preventing the reception of the communication data transmitted via the at least one communication channel of the vehicle by the control device or a control unit of the control device if the communication data transmitted via the at least one communication channel of the vehicle does not fulfil the data requirements; and
temporarily interrupting or permanently preventing the communication with a data source whose communication data, transmitted via the at least one communication channel of the vehicle, does not fulfil the data requirements.

* * * * *